Jan. 19, 1971    J. E. ORME    3,555,615
ROTATIONAL MOULDING MACHINES
Filed Aug. 8, 1968    3 Sheets-Sheet 1

United States Patent Office 3,555,615
Patented Jan. 19, 1971

3,555,615
ROTATIONAL MOULDING MACHINES
John Edward Orme, Hayway, Rushden, England, assignor to USM Corporation, Flemington, N.J., a corporation of New Jersey
Filed Aug. 8, 1968, Ser. No. 751,146
Int. Cl. B26c 5/04
U.S. Cl. 18—26                                    7 Claims

ABSTRACT OF THE DISCLOSURE

The invention relates to a machine for making articles of plastics material by rotational moulding. The machine has a number of mould carriers on which hollow moulds can be mounted. The mould carriers are supported in the machine in such a way that they can be rotated about a plurality of axes so that plastics material charged into a mould on a mould carrier can be caused to flow over the interior surface of the mould. The machine has door members which are arranged for swinging movement so that they can be moved into and out of operative positions in which they close an oven in which the moulds are heated by hot air.

BACKGROUND OF THE INVENTION

The manufacture of articles by rotational moulding from plastics materials in the form of powders and plastisols is known. Machines normally used for this type of process tend to be cumbersome, require a relatively large amount of effort by a machine operator and because of heating arrangements often used tend to give rise to discomfort of the operator.

SUMMARY OF THE INVENTION

It is an object of the present invention to provide a rotational moulding machine which is simple and easy to operate.

It is another object of the present invention to provide a rotational moulding machine having means for heating moulds of the machine without promoting discomfort of the operator.

With the above objects in view the present invention provides in one of its aspects a rotational moulding machine comprising a rotatable member on which pairs of main supporting arms are mounted, mould carrier arms rotatably supported by each pair of main supporting arms, mould carriers rotatably mounted on the mould carrier arms, means for rotating the mould carriers on the mould carrier arms, means for rotating the mould carrier arms, door members mounted for swinging movement into and out of positions in which they close an oven at a heating station of the machine at which a mould on a mould carrier may be heated, and means for rotating the rotatable member intermittently to move the mould carriers into and out of the heating station of the machine.

With the above objects in view the present invention also provides a rotational moulding machine comprising a rotatable member on which mould carrier arms are mounted, mould carriers mounted on the mould carrier arms and each adapted to support a mould, means for rotating the mould carriers on the mould carrier arms, means for rotating the mould carrier arms, means for moving the mould carriers into and through a plurality of operating stations comprising a loading station at which a mould on a mould carrier may be charged, a heating station at which the charged mould may be heated, a cooling station at which the heated mould may be cooled, means for stopping rotation of the mould carriers and the mould carrier arms at the loading station, door members which in their operative positions extend around a mould carrier and serve to close an oven at the heating station, means for moving the door members into their operative positions and means for moving the door members into inoperative positions to permit movement of a mould carrier into and out of the heating station.

The above and other aspects of the present invention including various novel details of construction and combinations of parts will now be described with reference to the accompanying drawings and pointed out in the claims. It will be understood that the particular machine embodying the invention is described by way of illustration only and not as a limitation of the invention. The principles and features of this ivention may be employed in various and numerous embodiments without departing from the scope of the invention.

DESCRIPTION OF THE PREFERRED EMBODIMENT

Figure 1:
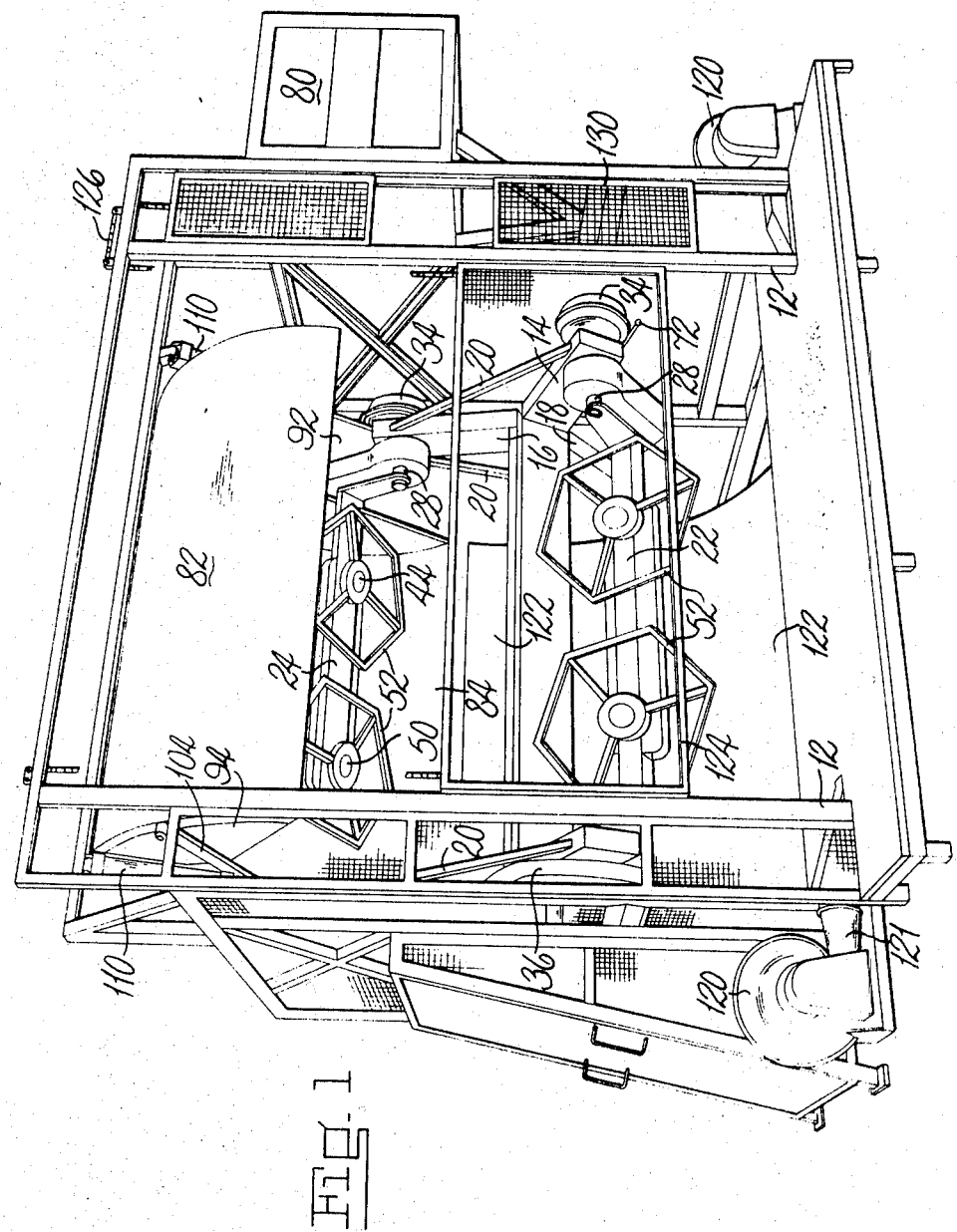
FIG. 1 is a perspective view of a rotational moulding machine embodying the invention.

Referring to the drawings, the machine is provided with a main rotatable member in the form of a shaft 10 which extends horizontally widthwise of the machine and is journalled in bearings (not shown) provided in the machine frame 12. Pairs of main supporting arms 14, 16, 18 are secured to opposed end portions of the shaft 10, the arms being connected together by tie rods 20 to form a triangular "spider" structure. The arms 14, 16, 18 are all of equal length and are spaced apart 120° on the shaft 10.

Figure 2:
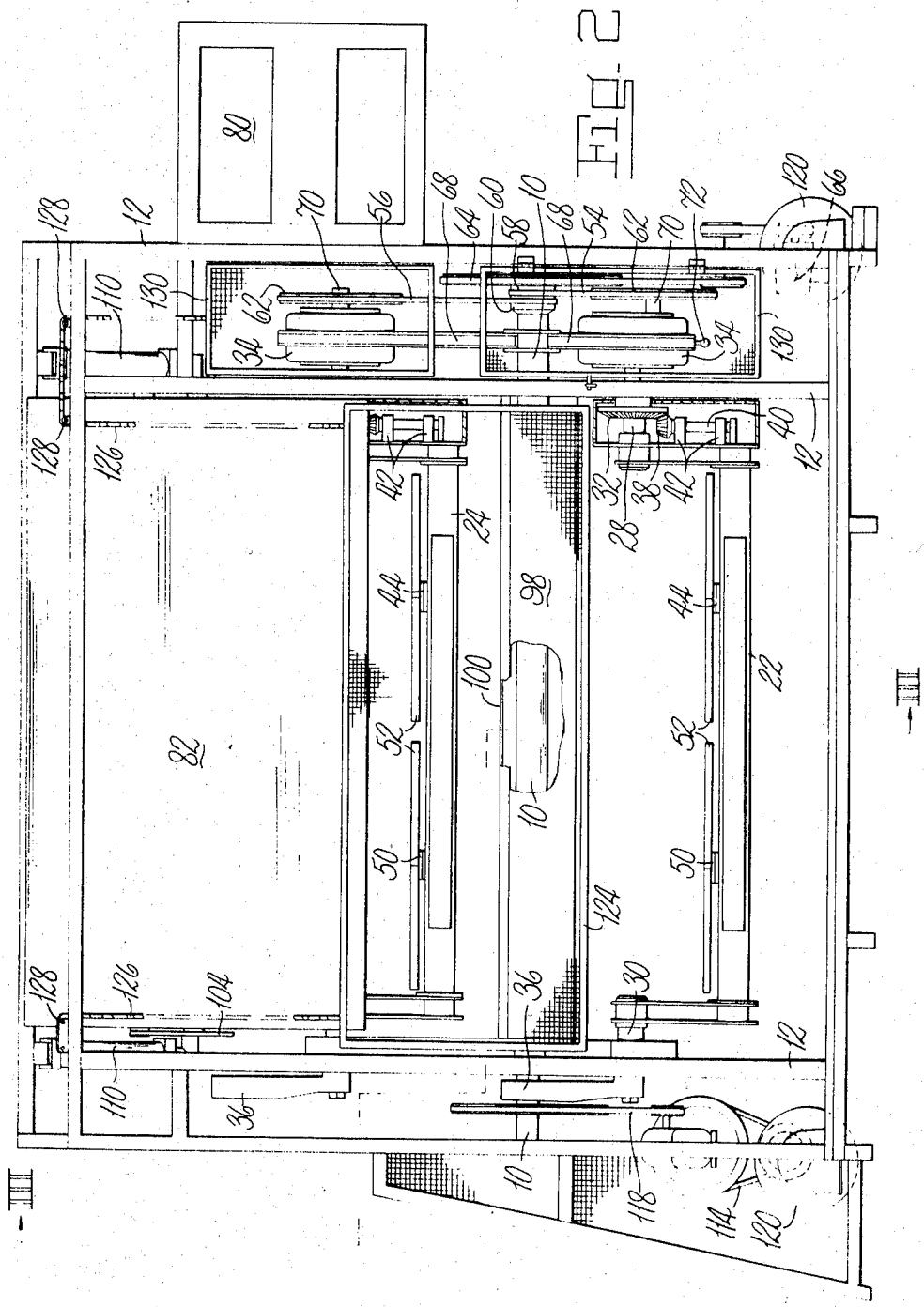
FIG. 2 is a front view of the machine shown in FIG. 1, showing parts of the machine in positions occupied during an operating cycle of the machine.

Mould carrier arms 22, 24, 26 are rotatably mounted between end portions of the pairs of arms 14, 16, 18. The mould carrier arms are generally U-shaped as shown in FIGS. 1 and 2 and are fixed to aligned stub-shafts, those at the right-hand side of the machine being numbered 28 and those at the left-hand side of the machine being numbered 30. The stub-shafts 30 each carry a counter balance weight 36. The stub-shafts 28 each carry a bevel gear 32 (FIG. 2) and a gear (not shown) which forms part of a drive arrangement 34. Each of the gears 32 meshes with a gear 38 fixed on a shaft 40, mounted in bearings 42. By this means the mould carrier arms can be rotated about the axis of the shafts 28 and 30. A sprocket is fixed to each of the shafts 40, and a driving chain 42 extends from this sprocket to another (not shown) which is secured to an end portion of a shaft 44. A second driving chain 46 extends from a second sprocket on the shaft 44 to another sprocket mounted on a shaft 50. The various shafts 44 and 50 are mounted in the mould carrier arms, and the chains are housed within the arms. Outer end portions of the shafts 44 and 50 each carry a mould carrier 52. By this means the mould carriers can be rotated on the mould carrier arms.

Each mould carrier 52 is of such a construction that one or more hollow moulds (usually of copper) may be clipped or otherwise fastened to it. It will be apparent that during operation of the machine the mould carrier can rotate about a plurality of axes, i.e., about the axis of the shaft (44 or 50) and about the axes of the shafts 28 and 30.

Each shaft 28 is driven by means of one of three driving belts 54, 56, 58 (see FIG. 2) each of which extends around a groove in a pulley 60 on the shaft 10 and around a pulley 62 associated with one of the drive arrangements 34. The pulley 60 is rotated continuously by means of a belt 64 driven from an electric motor 66 through a series of belts and pulleys. A casing of each arrangement 34 is secured by a strut 68 to the shaft 10, and contains meshing gears. The driving belts each pass over a pulley 62 carried by a shaft 70 extending out of the drive arrangement. Each shaft 70 can be moved towards the shaft 10 by mechanism controlled by a control rod 72 to an extent sufficient to allow the belt to slide on the pulley and avoid driving the shaft 70. When the shaft 70 is driven so is the corresponding shaft 28, and when the shaft 70 is not driven the corresponding shaft 28 is not driven. By operating the rod 72 an operator of the machine can stop rotation of the mould carriers as required for loading and unloading of moulds. A felt pad (not shown) is mounted on each of the arms 14, 16, 18 in a position such that when the shaft 70 is moved towards the shaft 10 the pad engages the pulley 62 and acts as a brake. The operator is thus able to control the position at which rotation of each of the carrier arms is stopped. Each shaft 44, 50 incorporates an adjustable slipping device (not shown) which permits rotation of the mould carriers on the mould carrier arms when rotation of the mould carrier arms has stopped. The operator is thus able to turn the mould carriers about their shafts 44 or 50 so that moulds of various shapes and designs can be mounted on the mould carriers and loaded and unloaded without undue difficulty.

Figure 3:
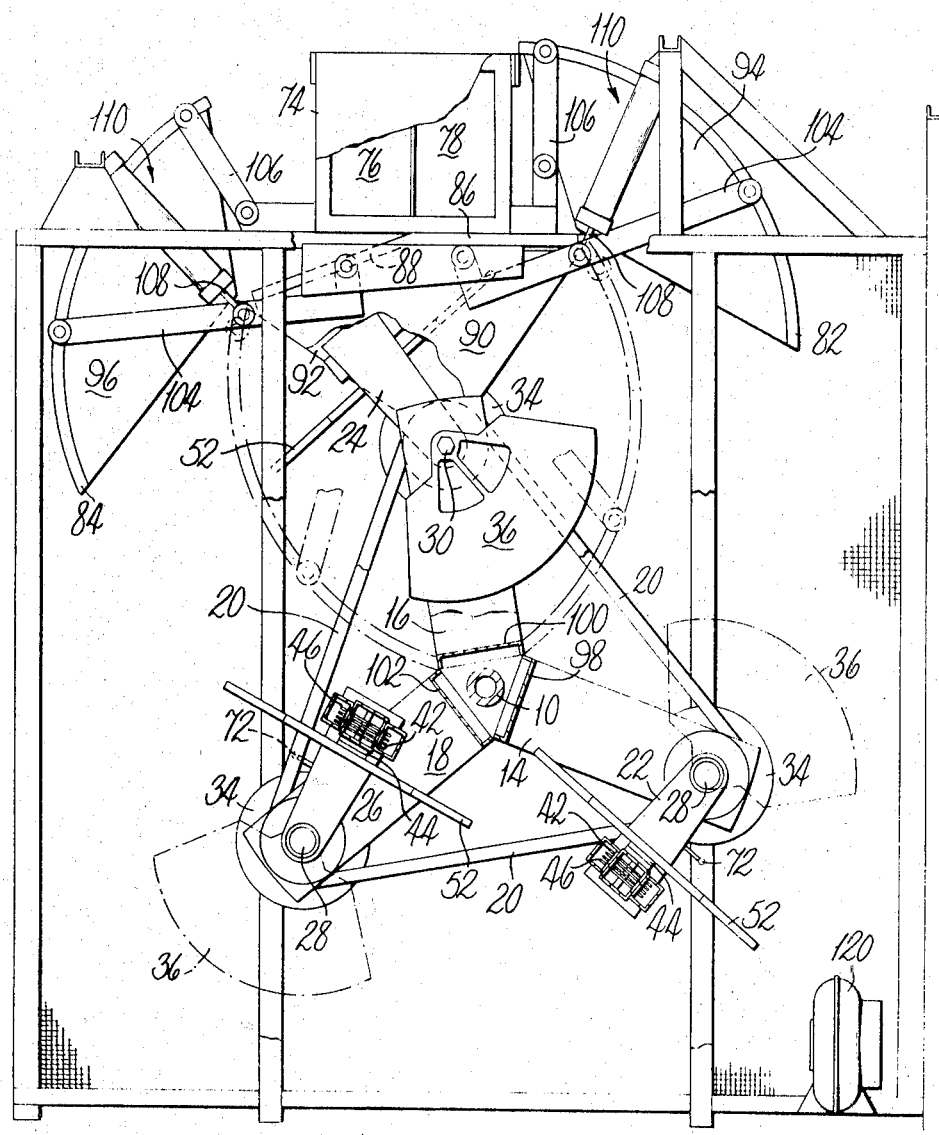
FIG. 3 is a sectional view taken substantially on the line III—III of FIG. 2 and showing the parts of the machine in positions occupied at the beginning of an operating cycle of the machine.

At the top of the machine there is provided ducting 74 (FIG. 3) for supplying heated air to a heating station of the machine at which moulds on the mould carriers may be heated. A lower part of the ducting is formed with openings (not shown) through which heated air is ducted towards or from the mould carriers, and the ducting 74 is divided vertically so that heated air can pass along one side 76 of the ducting to the heating station and return along the other side 78 of the ducting. The air is heated by an electric heater or by a burner 80 (FIG. 1), which may be arranged to burn either gas or oil. A fan is provided for urging the heated air along the ducting and flow of the heated air along the ducting occurs only when door members 82, 84 occupy operative positions shown in chain dotted lines in FIG. 3.

Secured to the frame 12 and the underside of the ducting 74 are plates 86, 88 which extend widthwise of the machine and provide upper surfaces of an oven at the heating station. These plates are formed with openings (not shown) through which the heated air is ducted. At each side of the machine, plates 90, 92 are secured which provide a portion of each side surface of the oven. The door members 82, 84 have curved outer surfaces and planar, segmental side portions 94, 96 and are formed so that in their operative positions they mate along their top edges with one or other of the plates 86, 88 along their side edges with the plates 90, 92 and with one or other of the pairs of arms 14, 16, 18, and along their bottom edges with one of three flat plates 98, 100, 102 secured to the pairs of arms 14, 16, 18 adjacent the shaft 10. The door members 82, 84 are of such a shape that when they are moved into their operative positions to close the oven in the manner just described they extend around and enclose one or other of the mould carrier arms and its mould carriers, the volume of the oven being just sufficient to permit the mould carriers 52 to be rotated in the oven about the plurality of axes.

Means is provided for moving the door members into their operative positions and for moving them into inoperative positions (shown in full lines in FIG. 3) to permit indexing of the main shaft 10 and the main supporting arms through 120°. Side portions of each door member are mounted for swinging movement on links 104, 106 the lower ones (104) of which are shorter than the upper ones (106) and are cranked upwards at their inner end portions. The inner end portions of the links are pivotally mounted on parts of the machine frame 12, and the outer end portions are pivotally connected to outer edge portions of the sides of the door members. Pivotally connected with a midportion of each link 104 is a piston rod 108 of an air operated piston and cylinder device 110. Each piston and cylinder device is pivotally mounted on the frame 12. The arrangement is such that when the piston rods 108 are extended from the cylinders of the piston and cylinder devices the door members are lowered and swing about the pivots of the links 104, 106 into their operative positions and when the piston rods 108 are withdrawn into the cylinders the door members are lifted into their inoperative positions.

A first microswitch (not shown) is mounted on the frame of the machine in such a position that when the door member 84 reaches its inoperative position the microswitch is operated. Operation of the first microswitch initiates operation of an electric motor 112 which drives the main shaft 10 through a belt and pulley arrangement 114 (see FIG. 2), a reduction gear 116 and a belt and pulley arrangement 118. The shaft 10 is driven to rotate, and when the shaft has rotated through 120° a second microswitch is operated which initiates cessation of the drive to the shaft, initiates operation of the piston and cylinder devices 110 to move the door members to their operative positions, causes a damper (not shown) to move in the ducting to allow the fan to urge heated air along the ducting 76, and also initiates operation of a time delay switch. The time delay switch controls supply of air under pressure to the piston and cylinder devices 110 to raise the door members and also controls the length of time for which the fan operates, damper allows passage of heated air along the ducting and is so set that the door members are raised and the passage of heated air is stopped after a time sufficient for adequate heating of the moulds.

Air blowers 120 and ducting 121 are provided for supplying cool air (which may carry droplets of water) to a cooling station at the rear of the machine to cool moulds heated in the oven, there being a curved baffle plate 122 against which the air impinges.

The machine has a sliding gate 124 at the front which is movable heightwise into and out of a position in which it obstructs access to moulds on the mould carriers. The gate hangs on chain 126 which pass over pulleys 128 on the machine frame. A left hand one of the chains 126 carries a counterbalance weight slidable inside a part of the frame 12 and a right-hand one of the chains is connected to a sliding gate 130 which slides in guideways in the frame 12. A hinged gate 130 is provided which must be swung by the operator before the rods 72 can be operated. A third microswitch is associated with the gate 124 and is arranged so that rotation of the shaft 10 can occur only when the gate 124 occupies the position shown in FIG. 1.

In an operating cycle of the machine the parts of the machine initially occupy positions as shown in FIG. 1. At this time the shaft 10 will have been indexed through 120°, the door members are about to move from their inoperative positions to their operative positions, and the motor 66 is driving each of the stub-shafts 28 so that the mould carriers are all rotating about their various axes of rotation. The machine operator raises the gate 124 and then swings the gate 130 about its hinges to gain access to the rod 72 of the drive arrangement associated with the carrier arm 22, and pushes it towards the shaft 10. Rotation of the carrier arm 22 and of the mould carriers on it is thus stopped. Moulds which are fastened on the mould carrier by clips are charged with a quantity of plastics material in plastisol or powder form. The gate 124 is lowered and then the rod is pulled away from the shaft 10 to reconnect the drive from the motor 66 to the shaft 28 and restart the rotation of the mould carriers.

After a time interval determined by the setting of the time delay switch the door members are swung to their inoperative positions and the shaft 10 is indexed through 120° to carry the mould carrier arm 22 into the heating station where the mould carriers continue to rotate. The door members are again moved automatically to their operative positions and enclose the mould carriers. Rotation of the mould carriers causes the plastics material in the moulds to spread over the interior of the moulds. Heating of the plastics material which occurs by conduction as a result of the passage of the hot air circulating through the oven and around the moulds is sufficient to cause at least partial gellation of plastisol materials used or sintering of the powder materials used.

After the moulds have been heated for the predetermined time (during which time moulds on the mould carriers supported by the arm 26 will have be charged with plastics material) the door members are swung to their inoperative positions, and the shaft 10 is again indexed through 120°. Indexing in this way carries the mould carrier arm 24 to the loading station, the mould carrier arm 26 to the heating station and the mould carrier arm 22 to the cooling station at the rear of the machine where the moulds are cooled by the cool air blown against the baffle plate 122 by the blowers 120. When the shaft 10 is next indexed through 120°, the parts return to their initial positions as shown in FIG. 1. The door members then move automatically to their operative positions, the gate 124 is lifted, the rod 72 is pushed to arrest the rotation of the mould carriers on the mould carrier arm 22. Mouldings formed in the moulds during operation of the machine are removed, the moulds again charged with plastics material and the gate is lowered in readiness for the next operating cycle.

Using the rotational moulding machine described and shown, articles of various shapes, sizes, and types can be reliably made with comparatively little effort on the part of the machine operator and with comparatively little discomfort from the heating arrangement.

Having described the invention, what I claim as new and desire to secure by Letters Patent of the United States is:

1. In a rotational moulding machine
   a plurality of moulding units each having a carrier arm mounted for rotation about one axis and a carrier mounted for rotation about another axis on the carrier arm whereby a mould mounted on the carrier is rotated about a plurality of axes,
   a rotatable member on which the moulding units are mounted for bodily movement
   a heating station having door members movable between inoperative positions permitting passage of a moulding unit into and out of the heating station and operative positions cooperating with the rotatable member to form an oven enclosing a moulding unit located at the heating station
   and means for indexing the rotatable member when the door members are in their inoperative positions to locate successive moulding units at the heating station.

2. A machine according to claim 1 in which the rotatable member is provided with pairs of radially extending support arms and each pair has mounted thereon the carrier arm of one moulding unit.

3. A machine according to claim 2 in which the door members in their operative positions cooperate with one pair of support arms and the rotatable member to form the oven enclosing the moulding unit mounted on said one pair of support arms.

4. A machine according to claim 1 in which there is also provided a mould loading and unloading station at which successive moulding units are located after passage through the heating station upon indexing of the rotatable member and means for stopping rotation of the carriers and carrier arms of the moulding unit located at the loading and unloading station.

5. A machine according to claim 4 in which means are provided for cooling the moulds mounted on each moulding unit after the moulds have been indexed from the heating station and before they have been located at the loading and unloading station.

6. A machine according to claim 1 in which means are provided for passing a heating medium into the heating station only when the door members are in their operative positions.

7. A machine according to claim 1 in which the door members occupy their operative positions for a predetermined period of time while the mold on the moulding unit located at the heating station is rotated and means are provided for moving the door members to their inoperative positions and for causing the indexing means to operate to locate a successive moulding unit at the heating station, said door moving means thereafter being effective to return the door members to their operative positions.

References Cited
UNITED STATES PATENTS

| | | |
|---|---|---|
| 2,681,472 | 6/1959 | Remfel _____ 18—26 |
| 2,957,202 | 10/1960 | Rekettye _____ 18—26 |
| 3,117,346 | 1/1964 | Bertin et al. _____ 18—26 |
| 3,237,247 | 1/1966 | Eggert et al. _____ 18—26 |
| 3,350,745 | 11/1967 | Schott et al. _____ 18—26 |
| 3,454,988 | 7/1969 | Cremer _____ 18—26 |

WILLIAM S. LAWSON, Primary Examiner